US011775936B1

(12) United States Patent
Zhang et al.

(10) Patent No.: US 11,775,936 B1
(45) Date of Patent: Oct. 3, 2023

(54) FORECASTING LONG DURATION FLOATING HOLIDAYS IN ONLINE TRAFFIC

(71) Applicant: Amazon Technologies, Inc., Seattle, WA (US)

(72) Inventors: Xiao Zhang, East Palo Alto, CA (US); Anbo Chen, Belmont, CA (US); Shan Kang, Mountain View, CA (US); Yuqing Xing, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 16/885,198

(22) Filed: May 27, 2020

(51) Int. Cl.
*G06Q 10/10* (2023.01)
*G06Q 10/1093* (2023.01)
(Continued)

(52) U.S. Cl.
CPC ......... *G06Q 10/1093* (2013.01); *G06F 17/18* (2013.01); *G06N 3/008* (2013.01);
(Continued)

(58) Field of Classification Search
CPC .... G06Q 10/04; G06Q 10/1093; G06F 17/18; G06N 3/008; G06N 20/00; G06N 20/10
See application file for complete search history.

(56) References Cited

U.S. PATENT DOCUMENTS

2008/0071465 A1* 3/2008 Chapman ............. G08G 1/0104
701/117
2017/0213257 A1* 7/2017 Murugesan ........ G06Q 30/0277
(Continued)

FOREIGN PATENT DOCUMENTS

WO    WO-2020177377 A1 *  9/2020

OTHER PUBLICATIONS

English translation of WO 2020177377 A1 (Year: 2020).*
(Continued)

*Primary Examiner* — Mehmet Yesildag
*Assistant Examiner* — Jeremy L Gunn
(74) *Attorney, Agent, or Firm* — NICHOLSON DE VOS WEBSTER & ELLIOTT LLP

(57) ABSTRACT

Techniques for forecasting long duration floating holidays in online traffic are described. According to some embodiments, a machine learning service receives a request to train a time series forecast model on time series data of a user, receives an input for the time series forecast model that comprises a first feature weight that represents a first pivot day and a second feature weight that represents a second pivot day, performs a linear interpolation on the first feature weight and the second feature weight for a day between the first pivot day and the second pivot day to generate a linearly interpolated first weight of the first feature weight for a feature vector and a linearly interpolated second weight of the second feature weight for the feature vector, determines a first coefficient for the time series forecast model based at least in part on the time series data of the user, the linearly interpolated first weight of the first feature weight from the feature vector, and the linearly interpolated second weight of the second feature weight from the feature vector, generates, by the time series forecast model comprising the first coefficient, a prediction for a future day, and transmits the prediction to the user.

20 Claims, 8 Drawing Sheets

(51) Int. Cl.
*G06F 17/18* (2006.01)
*G06N 20/00* (2019.01)
*G06Q 10/04* (2023.01)
*G06N 3/008* (2023.01)
*G06N 20/10* (2019.01)

(52) U.S. Cl.
CPC .............. *G06N 20/00* (2019.01); *G06N 20/10* (2019.01); *G06Q 10/04* (2013.01)

(56) References Cited

U.S. PATENT DOCUMENTS

| | | | | |
|---|---|---|---|---|
| 2019/0373101 | A1* | 12/2019 | Dotan-Cohen | ....... H04L 67/535 |
| 2021/0035569 | A1* | 2/2021 | Holm | ....................... G10L 15/02 |
| 2021/0365350 | A1* | 11/2021 | Fujita | ............... G06Q 10/06395 |

OTHER PUBLICATIONS

Matthias Seeger, David Salinas, and Valentin Flunkert. 2016. Bayesian intermittent demand forecasting for large inventories. In Proceedings of the 30th International Conference on Neural Information Processing Systems (NIPS'16). Curran Associates Inc., Red Hook, NY, USA, 4653-4661 (Year: 2016).*

Box et al., "Some Recent Advances in Forecasting and Control", Journal of the Royal Statistical Society, Series C (Applied Statistics), vol. 17, No. 2, 1968, pp. 91-109.

Box et al., "Time Series Analysis: Forecasting and Control", Fifth Edition, Wiley Series in Probability and Statistics, 2016, 709 pages.

Brockwell et al., "Introduction to Time Series and Forecasting", Second Edition, Springer, 2002, 449 pages.

Faloutsos et al., "Forecasting Big Time Series: Old and New", Proceedings of the VLDB Endowment, vol. 11, No. 12, 2018, pp. 2102-2105.

Flunkert et al., "DeepAR: Probabilistic Forecasting with Autoregressive Recurrent Networks", Artificial Intelligence, Apr. 2017, 11 pages.

Gooijer et al., "25 Years of Time Series Forecasting", International Journal of Forecasting, vol. 22, No. 3, 2006, 49 pages.

Harvey et al., "Forecasting, Structural Time Series Models and the Kalman Filter", Journal of the Operational Research Society, vol. 42, No. 11, Nov. 1991, pp. 1031-1033.

Kaastra et al., "Designing a neural network for forecasting financial and economic time series", Neurocomputing, vol. 10, 1996, pp. 215-236.

Laptev et al., "Time-series Extreme Event Forecasting with Neural Networks at Uber", ICML 2017 Time Series Workshop, 2017, 5 pages.

Livera et al., "Forecasting time series with complex seasonal patterns using exponential smoothing", Monash University, Department of Econometrics and Business Statistics, Oct. 2010, 40 pages.

Lu et al., "Financial time series forecasting using independent component analysis and support vector regression", Decision Support Systems, vol. 47, 2009, pp. 115-125.

Scott et al., "Predicting the Present with Bayesian Structural Time Series", Google, Inc., Jun. 28, 2013, pp. 1-21.

Seeger et al., "Bayesian Intermittent Demand Forecasting for Large Inventories", 30th Conference on Neural Information Processing Systems (NIPS 2016), 2016, pp. 1-9.

Taylor et al., "Forecasting at Scale", PeerJ Preprints, Sep. 2017, pp. 1-25.

Zhang et al., "Time series forecasting using a hybrid ARIMA and neural network model", Neurocomputing, vol. 50, 2003, pp. 159-175.

* cited by examiner

FORECASTING LONG DURATION FLOATING HOLIDAYS IN ONLINE TRAFFIC

BACKGROUND

Enterprises are generating more data than ever before. Trying to determine what data is relevant from that generated data is a non-trivial task. Traditionally, expertise in statistics and in artificial intelligence has been a prerequisite for developing and using machine learning models. For many business analysts and even for highly qualified subject matter experts, the difficulty of acquiring such expertise is sometimes too high a barrier to take full advantage of the large amounts of data potentially available to make improved business predictions and decisions.

BRIEF DESCRIPTION OF DRAWINGS

Various embodiments in accordance with the present disclosure will be described with reference to the drawings, in which.

DETAILED DESCRIPTION

Figure 1:
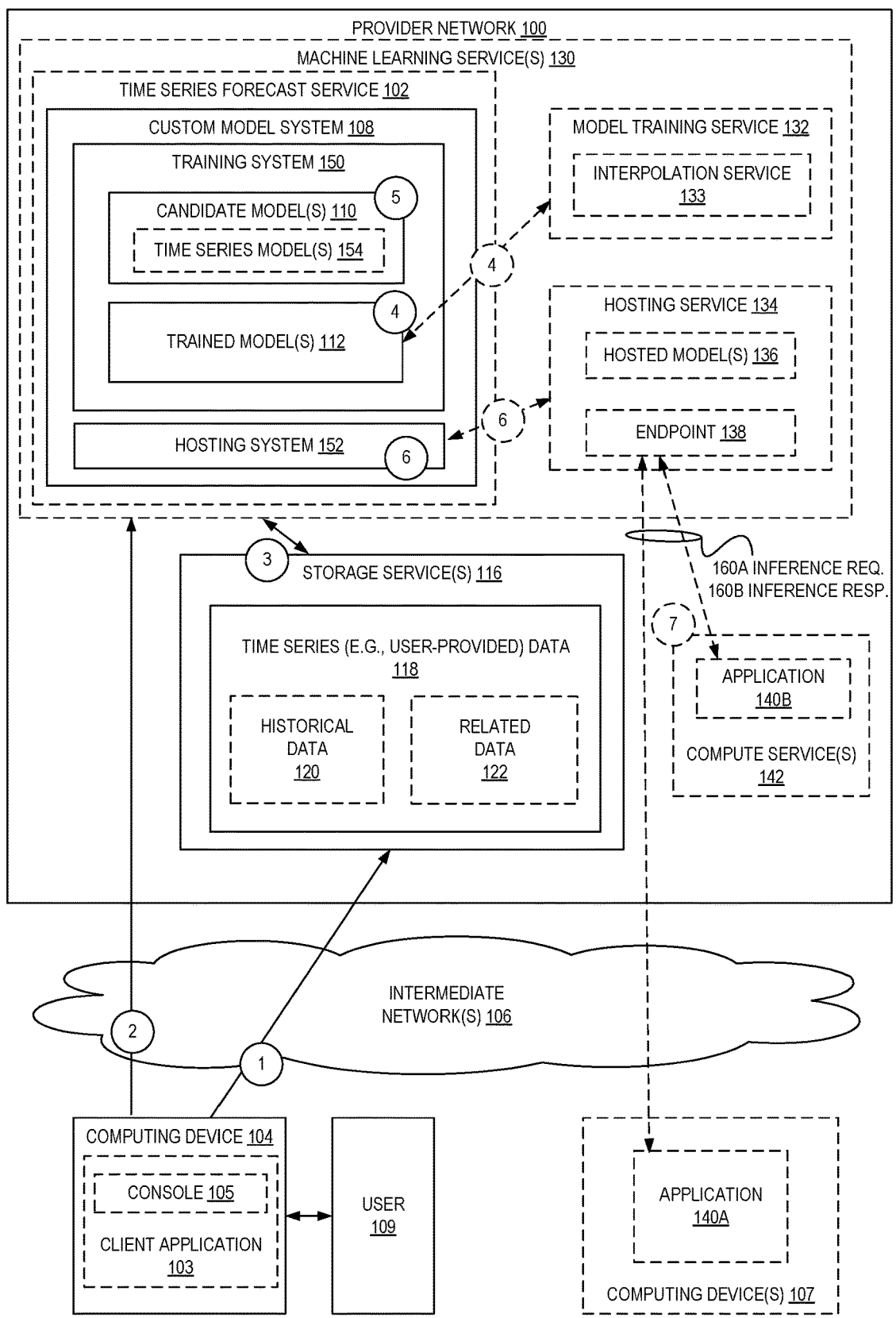
FIG. 1 is a diagram illustrating an environment for creating, training, and using a machine learning model according to some embodiments.

The present disclosure relates to methods, apparatus, systems, and non-transitory computer-readable storage media for time series modeling of floating days for a specific event (e.g., holiday). According to some embodiments, a machine learning service generates a time series forecast model (e.g., a machine learning model). Time series forecasting is a crucial task in many real-world business problems such as, but not limited to, revenue forecasting, inventory planning, and business planning In forecasting online traffic (e.g., web traffic), for example, online traffic to a particular (e.g., e-commerce) webpage, modeling of floating days for a specific event (e.g., holiday) may arise. The specific event may be a holiday in a certain region(s) or a specific event for a business, e.g., an Amazon® Prime Day® event, Black Friday, Cyber Monday, etc. Certain embodiments herein provide a semi-parametric approach to model long duration floating events (e.g., holidays) in time series modeling using an additive knots interpolation (AKI) model. The model may then be utilized to perform a prediction (e.g., from time series data).

Time series forecasting may play a central role in maximizing revenue and reducing operational costs in supply chains optimizations. In the context of advertising inventory forecasting, accurate time series forecasting supports the foundations to reliably predict the advertisement opportunities advertisement campaign budget planning in embodiments. The challenges to modeling online traffic (for example, to a particular webpage or subset (e.g., advertising slot) of that webpage) may come from users' (e.g., customers') shopping behavior on a certain event (e.g., a weekday) versus another event (e.g., weekend), diverse traffic patterns in different marketplaces, different growth patterns in various devices, and (e.g., most importantly), the strong seasonalities driven by a specific event (e.g., holiday). For examples, visits to an online retailer's webpage (e.g., homepage) on Black Friday may be significantly more than that of a regular Friday in November. In addition to traffic volume, a specific event (e.g., holiday) may also impact an indefinite range temporally. For example, the effects of Thanksgiving, Black Friday, and Cyber Monday may be seen for a time period (e.g., two weeks) before and a time period (e.g., five days) after.

A specific event may be a floating event, that is, it may fall on a different calendar date in certain years. For example, in the US, Thanksgiving currently falls on the fourth Thursday in November, and thus may be different dates in November. As another example, Amazon® Prime Day® event was introduced in 2015 in the US and is set at the beginning of each year, e.g., without a clearly defined rule. Yet to make modelling its effects more challenging, it also has expanded from a single day event to a 36-hour period in 2018 and a 48-hour period in 2019. These unique challenges compound on the existing complexities of modeling floating events canonically.

Embodiments herein provide a method to enable practitioners to model such complexities in time series efficiently, e.g., and with superior performance when compared against other models. Embodiments herein provide for generation of a time series forecast model that does not require expert judgements to successfully model a time series. Embodiments herein do not require a large training data set or noticeable correlations among the time series. Certain embodiments herein do not model seasonal time series patterns using trigonometrically formulated exponential smoothing, e.g., a method focusing on effect introduced by diverse seasonal (e.g., holiday) effects but without addressing the problem of floating events (e.g., holidays) explicitly. Certain embodiments herein do not adopt a generalized additive model (GAM) framework and model the event (e.g., holiday) effects as Gaussian-prior additive components onto the overall traffic.

Certain embodiments herein tailor a forecast model towards the specific problem of interest and introduce a model customized to a user's unique traffic patterns. Certain embodiments herein introduce a class of approaches to model the indefinite duration floating events (e.g., holidays) for a user's customer visit traffic. In one embodiment, a time series forecast model is based on a log-linear regression framework. Certain embodiments herein utilize feature vectorization which allows flexible structures (e.g., pivot days) to model effects of floating events in time series forecasting. Certain embodiments herein can also be used for any practical problems involving floating events with indefinite durations. Additionally, a back-testing (e.g., and validation) framework is discussed herein which enables the efficient comparison of the performance of different models.

FIG. 1 is a diagram illustrating an environment for creating, training, and using an aggregated machine learning model according to some embodiments. FIG. 1 includes a time series forecast service 102, one or more storage services 116, one or more machine learning services 130, and one or more compute services 142 implemented within a multi-tenant provider network 100. Each of the time series forecast service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The time series forecast service 102, in some embodiments, is a machine learning powered service that makes it easy for users to understand, find insights in, and identify probable future events in data (e.g., "predictions"). For example, users may use the time series forecast service 102 to analyze historical time series data 120, such as sales data, online traffic, etc., and/or related data 122 (e.g., holidays, product descriptions, promotions, etc.). In some embodiments, the time series forecast service 102—via use of a custom model system 108—allows users to build and use trained model(s) 112. Although time series data is one example where an inference (e.g., prediction) may be performed, this disclosure is not limited to time series data and time series models 154.

The custom model system 108, for example, may enable users to generate trained models 112 from candidate models 110. Embodiments herein allow a customer to create trained models 112 by supplying data 118. Data 118 may include time series data 120 and/or data 122 related to the time series data. Data 118 may include (e.g., labeled) training data and/or evaluation data. Data 118 may include multiple device types (e.g., desktop, mobile, etc.) and/or different webpage types (e.g., search page, product detail page, etc.).

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a plurality of candidate models 110 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 109 may provide or otherwise identify data 118 (e.g., historical data 120 and/or related data 122) for use in creating a custom model. For example, as shown at circle (1), the user 109 may utilize a client application 103 executed by a computing device 104 (e.g., a web-application implementing a console 105 for the provider network 100, a standalone application, another web-application of another entity that utilizes the time series forecast service 102 as a part of its backend, a database or mixed-SQL environment, etc.) to cause the computing device 104 to upload the data 118 to a storage location (e.g., provided by a storage service 116 such as an object storage service of a provider network 100).

The data 118 may be a columnar dataset that includes rows (or entries) of data values, where the data values may be arranged according to one or more columns (or attributes) and may be of a same datatype (e.g., one storing text). In some cases, the data 118 includes headings or other metadata describing names or datatypes of the columns, though in some cases this metadata may not exist. For example, some or all of the data 118 may have been provided by a user as a plaintext file (e.g., a comma-separated values (CSV) or tab-separated values (TSV) file), an exported database table or structure, an application-specific file such as a spreadsheet, etc.

For example, when a user 109 desires to train a time series candidate model 110, this file (or files) may be a CSV with at least two values per row—e.g., one column storing historical time series data, such as sales data, online traffic, etc., and another column storing a time period (e.g., day(s)) associated with the time series data (e.g., as a time stamp in Coordinated Universal Time (UTC) format)—e.g., "traffic, time". In one embodiment, each file of a plurality of files is for a respective webpage or subset (e.g., advertising slot) of that webpage, e.g., with the file's title identifying the particular webpage or subset.

Thereafter, at circle (2) the computing device 104 may issue one or more requests (e.g., API calls) to the machine learning service 130 that indicate the user's 109 desire to train one or more candidate models 110 into one or more trained models 112. The request may be of a type that identifies which type of model(s) are to be created or identifies that the machine learning service 130 itself is to identify the candidate model(s) 110. The request may also include one or more of an identifier of a storage location or locations storing the data 118 (e.g., an identifier of the historical data 120 and/or related data 122), which may identify a storage location (e.g., via a Uniform Resource Locator (URL), a bucket/folder identifier, etc.) within the provider network 100 (e.g., as offered by a storage service 116) or external to the provider network 100, a format identifier of the data 118, a language identifier of the language of the data 118, etc. In some embodiments, the request includes an identifier (e.g., from the user 109) of the candidate model(s) 110 themselves within the request.

Responsive to receipt of the request, the custom model system 108 of the machine learning service 130 is invoked and begins operations for training the corresponding type of model. For example, the custom model system 108 may identify what type of model is to be trained (e.g., via analyzing the method call associated with the request), the storage location(s) associated with the data 118 (e.g., historical data 120 and/or related data 122), etc. Thus, the custom model system 108 may retrieve any stored data 118 elements as shown at circle (3), which may be from a storage location within the provider network 100 or external to the provider network 100.

In some embodiments, the training (at circle (4)) of the candidate models 110 includes performing (at optional, dotted circle (4)) candidate models 110 by training service 132 of machine learning service 130 described herein a particular training job (e.g., hyperparameter optimization tuning job), or the like. In some embodiments, the machine learning services 130 includes (at optional, dotted circle (5)) selecting of a proper subset of candidate models from a plurality of candidate models 110 for training by training service 132. In some embodiments, the hosting system 152 (at circle (6)) of the custom model system 108 may make use (at optional, dotted circle (6)) of a hosting service 134 of a machine learning service 130 to deploy a model as a hosted model 136 in association with an endpoint 138 that can receive inference requests from client applications 140A and/or 140B at circle (7), provide the inference requests 160A to the associated hosted model(s) 136, and provide inference results 160B (e.g., a prediction, including, but not limited to, predicted classes, predicted entities, predicted events, etc.) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100. Inference results 160B may be displayed to a user (e.g., in a graphical user interface of the application) and/or exported as a data structure (e.g., in a selected format). Candidate model(s) 110 may include one or more time series model(s) 154.

The below discusses modeling floating events (e.g., holidays) with indefinite duration under a log-linear model framework (e.g., of time series model 154), however, this is an example, and the feature engineering method itself can be applied to model families outside of log-linear regression. In one embodiment, log-linear model is the most intuitive for interpretation and simple to implement for practical applications.

Given the traffic N(t) at any time t, the logarithmic traffic may model y(t)=ln N(t) as:

$$y(t) = \sum_i \beta_i X_i(t) + \epsilon, \quad (1)$$

in which X(t) is the feature vector of time t and β are their corresponding coefficients, the error term E in certain embodiments is assumed to be zero meaned and independently and identically distributed with respect to t. Following a general regression framework, the model may then be trained to learn the optimized set of parameters (e.g., coefficient(s) β) that minimize a certain loss function (e.g. using a squared loss L=(|y(t)−ŷ(t)|)$^2$). In certain embodiments, an exponentially decaying function is utilized to weigh training data (e.g., historical data 120 in FIG. 1) differently, for example: w(t)=2$^{(t-t0)/\tau}$, where t0 is the most recent time period (e.g., day) in the training data and τ is a hyperparameter that mimics the half-life of decay, for example, to weigh the data so that all training data is not are equally important, e.g., the more recent data are weighed more heavily than older data (e.g., to adapt to fast growing business with a rapidly changing trend). In certain embodiments, this term does not fundamentally change a model since the weighted target function can be rewritten in as ỹ=w(t)*y(t). For simplicity, the weight function is not rewritten in the below.

In one embodiment, the main features of a model are growth (e.g., yearly growth), day of the week (e.g., Monday, Tuesday, Wednesday, Thursday, Friday, Saturday, or Sunday), month of the year (e.g., January, February, March, April, May, June, July, August, September, October, November, or December), and other (e.g., special) events (e.g., "knots" as discussed herein). Formally speaking, a model may be separated into three components:

$$y(t) = \sum_i \beta_i X_{growth,i}(t) + \sum_j \beta_j X_{week,j}(t) + \sum_k \beta_k X_{knots,k}(t), \quad (2)$$

in which $X_{grow}$ the is the trend component including long-term growth (e.g., a feature vector for the long-term growth features), $X_{week}$ is the day-of-the-week feature for modelling weekly seasonality (e.g., a feature vector for the weekly features), and $X_{knots}$ are the knots (e.g., pivot days) features that model long term seasonality (e.g., a feature vector for the long-term growth features). In one embodiment, the $X_{knots}$ component includes both month of the year features and special events. The below discusses examples for model each of these three components. It should be understood that a model may use one of or any combination of these components.

In certain embodiments, the growth component is modeled to be linear with respect to logarithmic traffic, for example: $X_{growth}$ is directly proportional to time (e.g., $X_{growth} \partial t$).

In certain embodiments, the weekly component uses an indicator function for that date: $X_{week}(t)$=[1(t∈Dmon), ..., 1(t∈Dsat)], where Dmon indicates the set of all the Mondays and likewise for the other days. In one embodiment, a model uses six independent features for the day-of-the-week effect and leaves out Sunday, e.g., to reduce the degrees of freedom in the model and avoid multicollinearity.

In certain embodiments, the knots component (e.g., for month-of-the-year and/or floating events) is not modeled using a dummy variable, e.g., because it fails to consider the long duration of certain events (e.g., holidays). In certain embodiments herein, the dates around an event (e.g., holiday) are not also modeled as the event (e.g., holiday) themselves, e.g., as introduced "dummy events".

In certain embodiments herein, a model uses knots (e.g., pivot days)(e.g., pivot time periods) placed on the time axis so that the durations of the event (e.g., holiday) is modeled explicitly. In one embodiment, both month-of-the-year and events (e.g., holidays) represent the long-period seasonality of a time series, e.g., where they occur annually or at least for two years.

In certain embodiments, the month-of-the-year and event (e.g., holiday) features are modeled together. In certain embodiments, the long-period seasonality is modeled by introducing knot time periods (e.g., knot days) (e.g., pivot days) into the features (e.g. into the feature vector $X_{knots}$) In one embodiment, knot days (or knots) are a list of pivot days. In certain embodiments, using knot days (e.g., pivot days) in the features (e.g. into the feature vector $X_{knots}$) allows for (i) floating events (e.g., holidays) to be easily inserted into the list; and (ii) the duration of the event (e.g., holiday) is modeled by introducing more knots in the feature vector, e.g., as shown in FIG. 2.

Figure 2:
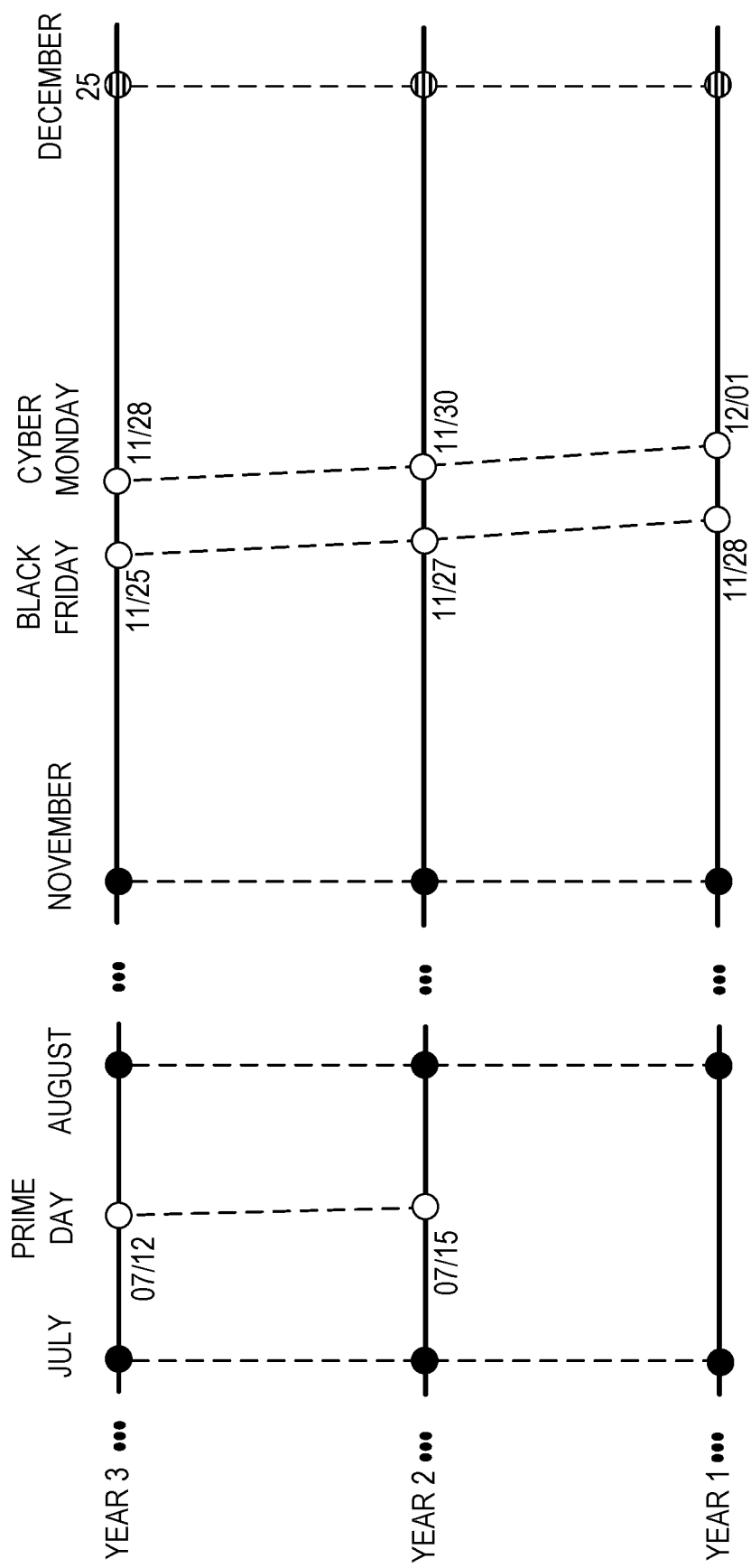
FIG. 2 is a diagram illustrating a timeline comprising a plurality of pivot days across three years according to some embodiments.

FIG. 2 is a diagram illustrating a timeline comprising a plurality of pivot days across three years according to some embodiments. Knots related to the floating events are represented by hollow circles, monthly events are represented by filled-in circles, and fixed events are represented by hashed circles. FIG. 2 illustrates the knots representing unique floating events (e.g., holidays) across three years. In one embodiment, Black Friday and Cyber Monday are considered as events themselves introduced by Thanksgiving. The knots depicted herein are only examples, for example, fewer or more knots may be utilized. In one embodiment, a model uses more knots near Prime Day® events and November/December time frame.

Knots may be selected by the model training service (e.g., model training service 132 in FIG. 1) and/or a user (e.g., user 109 in FIG. 1).

In certain embodiments, the knot features differ from others method in that given a date, instead of using an indicator function for representing if the date is a particular event (e.g., holiday) or not, an (e.g., linear) interpolation if performed for a date(s) between the two knots that encapsulate it. For example, if the knots are April 1st and May 1st, the date April 16th could be thought of as a linear interpolation of the two with equal weights of a half weight for the feature from April 1$^{st}$ and a half of the feature weight from May 1st. To be more specific, let $\mathcal{K}$ ={K$_1$, K$_2$, ... } denote the set of knots of interests for the model, for example, where each date is represented using integers, e.g. using the proleptic Gregorian ordinal of the date of YEAR-MONTH-DAY (YYYY-MM-DD). In one embodiment, without loss of generality, the set is sorted in ascending order (e.g., K$_1$< K$_2$< ... ) and let "t" be a time period (e.g., a calendar day) that falls between two knots K$_a$ and K$_b$ such that K$_a$≤t<K$_b$, then the knots related features may be written as:

$$X_{knots,k}(t) = \begin{cases} (t - K_a)/(K_b - K_a) & \text{if } k = a, \\ (K_b - t)/(K_b - K_a) & \text{if } k = b, \\ 0 & \text{otherwise.} \end{cases} \quad (3)$$

As one example, a model includes a first knot for Black Friday and a Second knot for Cyber Monday (e.g., for each year). Using FIG. 2 as an example, Black Friday is selected as a first knot (e.g., "a" in (3) above) and Cyber Monday is selected as a second knot ("b" in (3) above). In this example, assuming the feature is a weight between 0 and 1, in one embodiment, Black Friday's feature weight ($FW_{BF}$) is assigned a 1 and Cyber Monday's feature weight ($FW_{CM}$) is assigned a 1, and thus using (3), the weights for the two days between those knots is:
- for the day immediately after Black Friday in year 3 (assuming year 3 is 2016 for this example, Black Friday is 20161125 and the day (t) immediately after that is 20161126):
  $K_b-K_a$=(simplified to 28-25)=3, and $K_b-t$=(simplified to 28-26)=2, so the first linearly interpolated weight for the day immediately after Black Friday is ⅔ of Black Friday's feature weight ($FW_{BF}$), and
  $K_b-K_a$=(simplified to 28-25)=3, and $t-K_a$=(simplified to 26-25)=1, so the second linearly interpolated weight for the day immediately after Black Friday is ⅓ of Cyber Monday's feature weight ($FW_{CM}$), for example, and these weights may be concatenated in a feature vector having one or more entries for that day, e.g., as [(⅔), (⅓)]; and
- for the day immediately before Cyber Monday in year 3 (assuming year 3 is 2016 for this example, Cyber Monday is 20161128 and the day (t) immediately before that is 20161127):
  $K_b-K_a$=(simplified to 28-25)=3, and $K_b-t$=(simplified to 28-27)=1, so the first linearly interpolated weight for the day immediately before Cyber Monday is ⅓ of Black Friday's feature weight ($FW_{BF}$), and
  $K_b-K_a$=(simplified to 28-25)=3, and $t-K_a$=(simplified to 27-25)=2, so the second linearly interpolated weight for the day immediately before Cyber Monday is ⅔ of Cyber Monday's feature weight ($FW_{CM}$), for example, and these weights may be concatenated in a feature vector having one or more entries for that day, e.g., as [(⅓), (⅔)].

In one embodiment, the feature weights for those four days may thus take the form of feature weights for {knot 1, knot 2} for each day, for example, with the above example taking the form of [{1,0}{(⅔),(⅓)}{(⅓),(⅔)}{0,1}].

Thus, certain embodiments herein utilize (3) above to generate feature vector(s) (e.g., feature vectorization) for the $X_{knots}$ component in algorithm (2) above for a time series model. As such a model is additive in nature and utilizes interpolation between pivot time periods (e.g., days) represented by knots, it may be referred to as an additive knots interpolation (AKI) model.

It should be understood that other (e.g., non-linear) interpolations between two knots may be utilized. In certain embodiments, linear interpolation performs the best.

As discussed above, knots may be selected by the model training service (e.g., model training service 132 in FIG. 1) and/or a user (e.g., user 109 in FIG. 1). For example, where the model training service fully automates the selection of hyperparameter tuning (e.g., including knot selection) by grid search or other hyperparameter optimization methods. As another example, a user (e.g., with minimal knowledge of machine learning) picks a few important knots (e.g., days), but due to the interpolations between knots, setting the boundary and the important dates as knots is sufficient to achieve high performance.

The models discussed herein can be trained very efficiently. Thus, certain embodiments herein implement a model hybridization framework that combine multiple models with different hyperparameters to boost forecast performances. Referring again to the half-life decay parameter ti discussed above as an example, certain embodiments of models with smaller ti place weight more heavily on the more recent training data and therefore are expected to perform better for short-term forecasts and models with a larger ti on the other hand are expected to work better for long-term forecasts. In certain embodiments, the forecasts (e.g., predictions) are combined by introducing a customizable hybridizing weight function such that $\hat{y}(t)=\Sigma_i*\hat{y}_i(t)$, where $\hat{y}_i(t)$ is the model output for base model i and sum of these weights is $\Sigma_i W_i=1$ (e.g., applying a uniform weight function $W_i=1/n$ for n base models). In certain embodiments herein, multiple models are combined as a hybrid model (e.g., using two or more base models) to provide high performance and is less susceptible of overfitting in practice.

Figure 3:
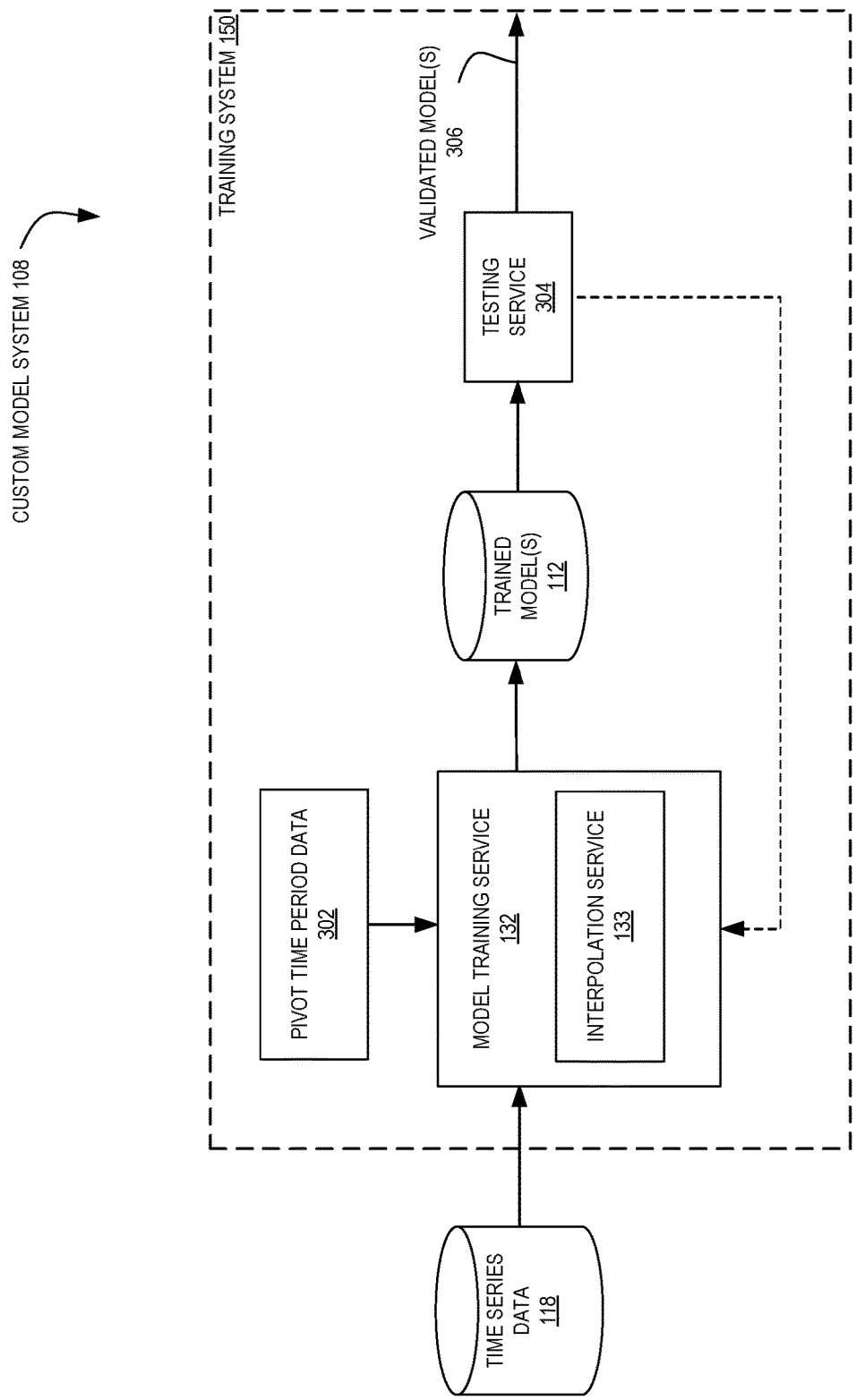
FIG. 3 is a diagram illustrating a custom model system that includes a model training service having an interpolation service to create one or more trained models according to some embodiments.

FIG. 3 is a diagram illustrating a custom model system 108 that includes a model training service 132 having an interpolation service 133 to create one or more trained models 112 according to some embodiments. In FIG. 3, the time series data 118 is input into the model training service 132 along with pivot time period data 302 (for example, pivot time periods (e.g., pivot days) selected by a user and/or training system 150). Interpolation service 133 may then perform an interpolation on the pivot time period data 302 to generate the feature vector(s) (e.g., feature weights of the feature vector(s)). The feature vector(s) may then be used in the $X_{knots}$ component in an algorithm (e.g., algorithm (2) above), and that algorithm trained on time series data 118 to generate one or more trained models 112, for example, by varying the corresponding coefficients (β) for the components to fit the model to the time series data within an acceptable accuracy threshold. In one embodiment, testing service 304 tests the trained model(s) 112 and for any model(s) that passed the test are passed on as validated model(s) 306 (e.g., for use as a hosted model(s) 136 in FIG. 1) and that did not pass the test are returned to model training service 132, for example, for changing of the parameters (e.g., coefficient(s) β) and/or algorithm.

Figure 4:
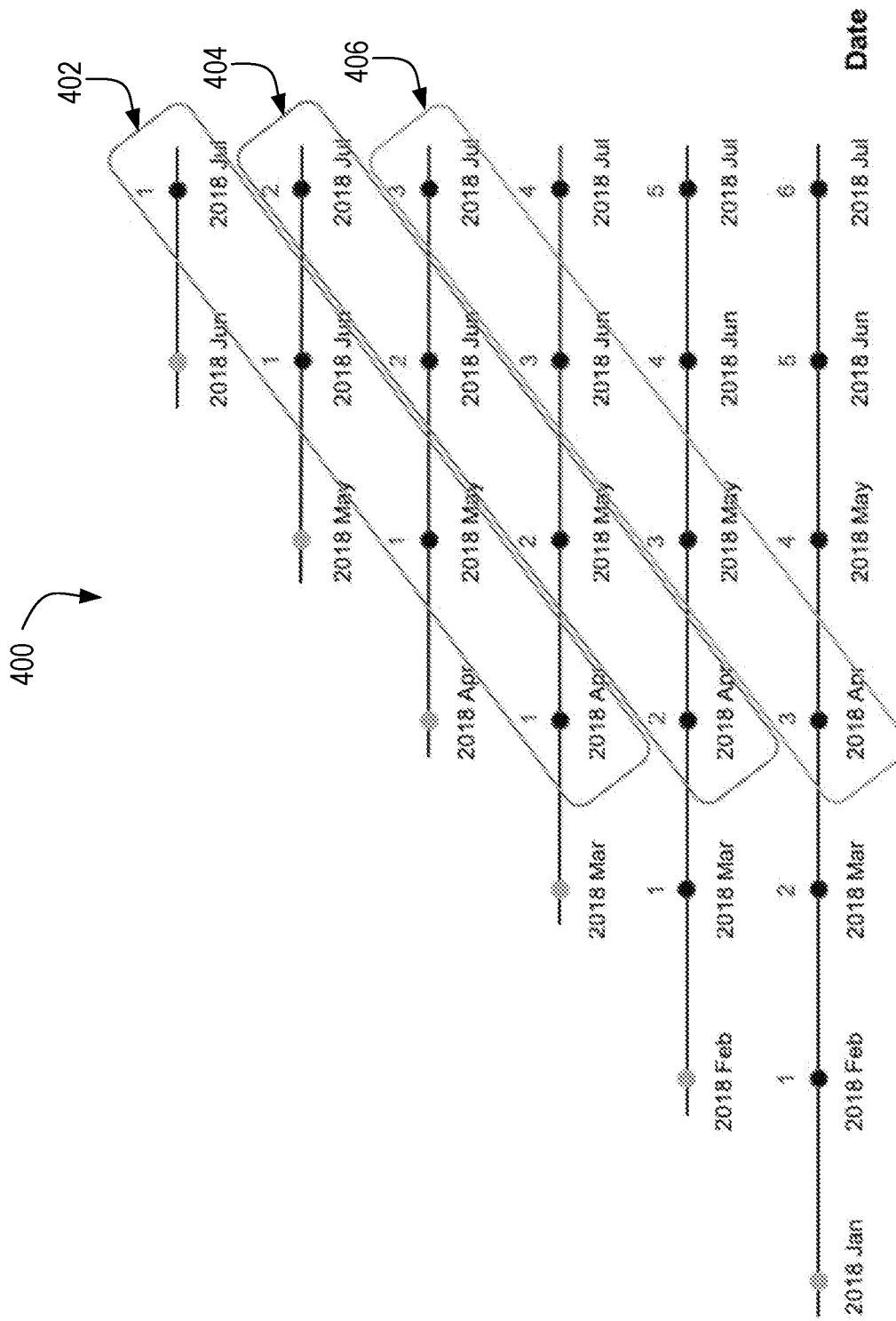
FIG. 4 is a diagram illustrating a back-testing framework according to some embodiments.

To measure the performance of forecasts (e.g., predictions), especially at different forecast time horizons, testing service 304 may utilized a back-testing framework to efficiently compute error metrics across a wide range of forecast horizons. This may include using a modified time series cross-validation (e.g., rolling evaluations) approach. In certain embodiments, at each forecast horizon, the error metrics are determined based on the same number of validation forecasts. FIG. 4 illustrates an example back-testing framework that may be utilized by testing service 304.

FIG. 4 is a diagram illustrating a back-testing framework 400 according to some embodiments. Each horizontal line represents a forecast made using data up to the leftmost node in each line. The number above each other node indicates the corresponding forecast horizon of the month, e.g., 1 for horizon 402, 2 for horizon 404, and 3 for horizon 406. In this example, to calculate average forecast error with a horizon window (e.g., a plurality of months), the time series forecast service (e.g., testing service) collects forecasted and actual data as highlighted by a horizon (e.g., horizon 402, horizon 404, or horizon 406), and computes the error and the average.

Error determination may utilize a scale-invariant daily mean absolute percentage error (MAPE):

$$MAPE = \frac{100\%}{n} \sum_{t=1}^{n} \frac{|N(t) - F(t)|}{N(t)} \qquad (4)$$

where F(t) is the forecasted traffic (e.g., volume) and N(t) is the actual traffic (e.g., volume).

Figure 5:
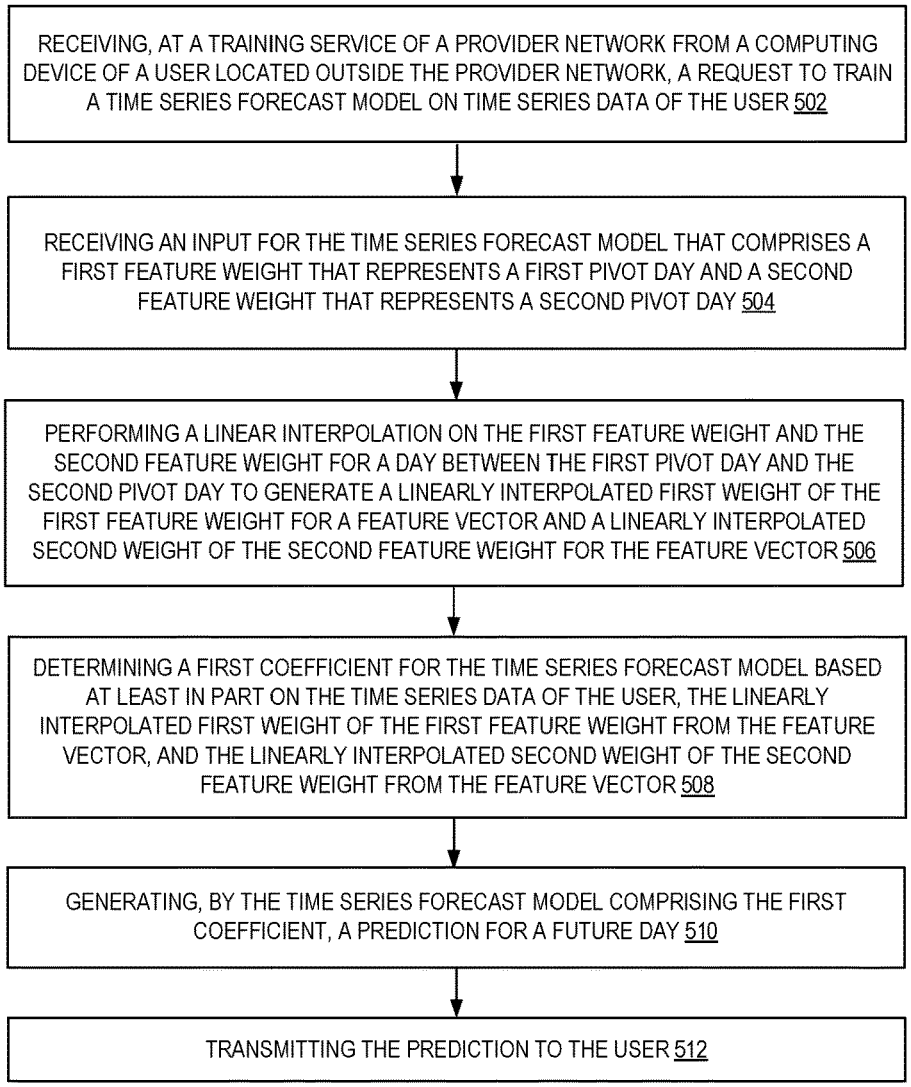
FIG. 5 is a flow diagram illustrating operations of a method for generating a prediction for a future day with a time series forecast model according to some embodiments.

FIG. 5 is a flow diagram illustrating operations 500 of a method for generating a prediction for a future day with a time series forecast model according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by provider network 100 of the other figures.

The operations 500 include, at block 502, receiving, at a training service of a provider network from a computing device of a user located outside the provider network, a request to train a time series forecast model on time series data of the user. The operations 500 further include, at block 504, receiving an input for the time series forecast model that comprises a first feature weight that represents a first pivot day and a second feature weight that represents a second pivot day. The operations 500 further include, at block 506, performing a linear interpolation on the first feature weight and the second feature weight for a day between the first pivot day and the second pivot day to generate a linearly interpolated first weight of the first feature weight for a feature vector and a linearly interpolated second weight of the second feature weight for the feature vector. The operations 500 further include, at block 508, determining a first coefficient for the time series forecast model based at least in part on the time series data of the user, the linearly interpolated first weight of the first feature weight from the feature vector, and the linearly interpolated second weight of the second feature weight from the feature vector. The operations 500 further include, at block 510, generating, by the time series forecast model comprising the first coefficient, a prediction for a future day. The operations 500 further include, at block 512, transmitting the prediction to the user.

In certain embodiments, a time series forecast service receives time series data and trains a model based on the current hyperparameters. After which the system performs a back-testing automatically to generate metrics for reporting in certain embodiments. The time series forecast service may search for potentially better hyperparameters to adapt to recent changes in the time series data (e.g., in a traffic pattern therein). In certain embodiments, a user (e.g., human) approves of a new model before it is used (e.g., hosted).

Certain embodiments herein are directed to an AKI model that uses a regression-based modeling approach to handle floating events (e.g., holidays), and even those floating events with indefinite durations. Embodiments herein correctly generate predictions from time series data (e.g., about online traffic) with strong seasonality around floating events, for example, events with seasonalities in irregular intervals and/or events with dates not based on the Gregorian calendar. The models disclosed herein can be extended and applied to other time series problems. The model framework disclosed herein can be used for time series with time duration other than discrete (e.g., 24 hour) days.

Figure 6:
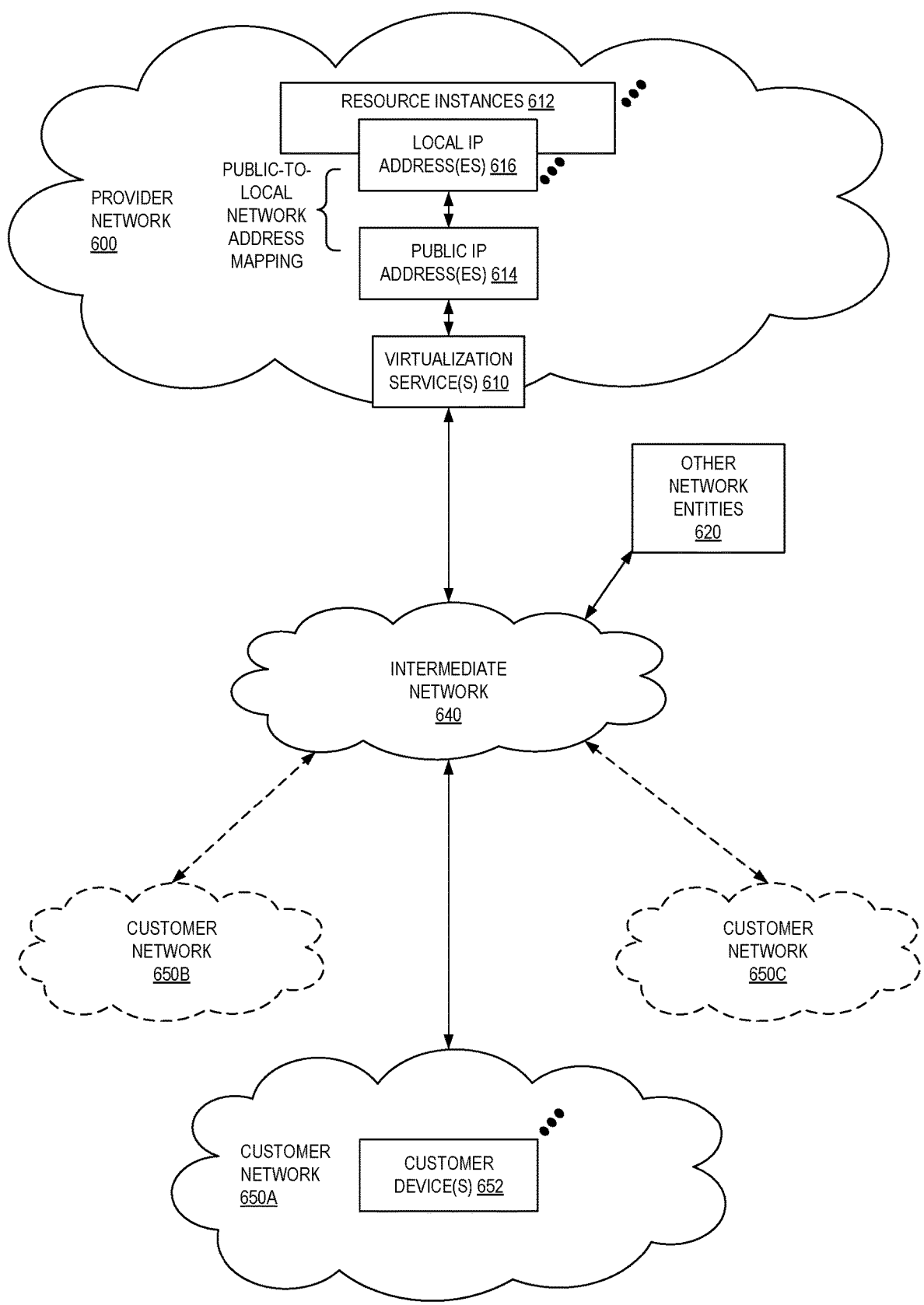
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
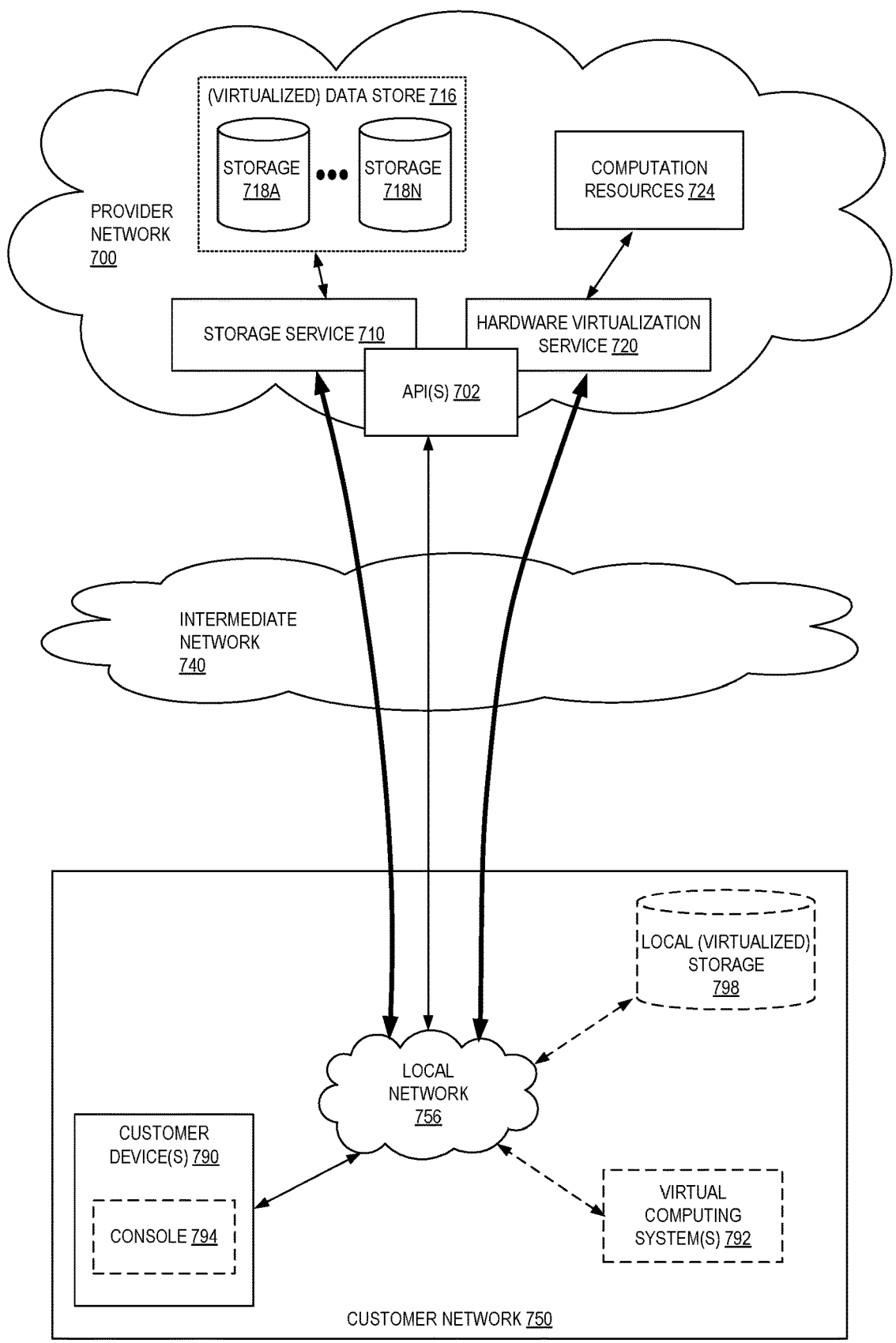
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
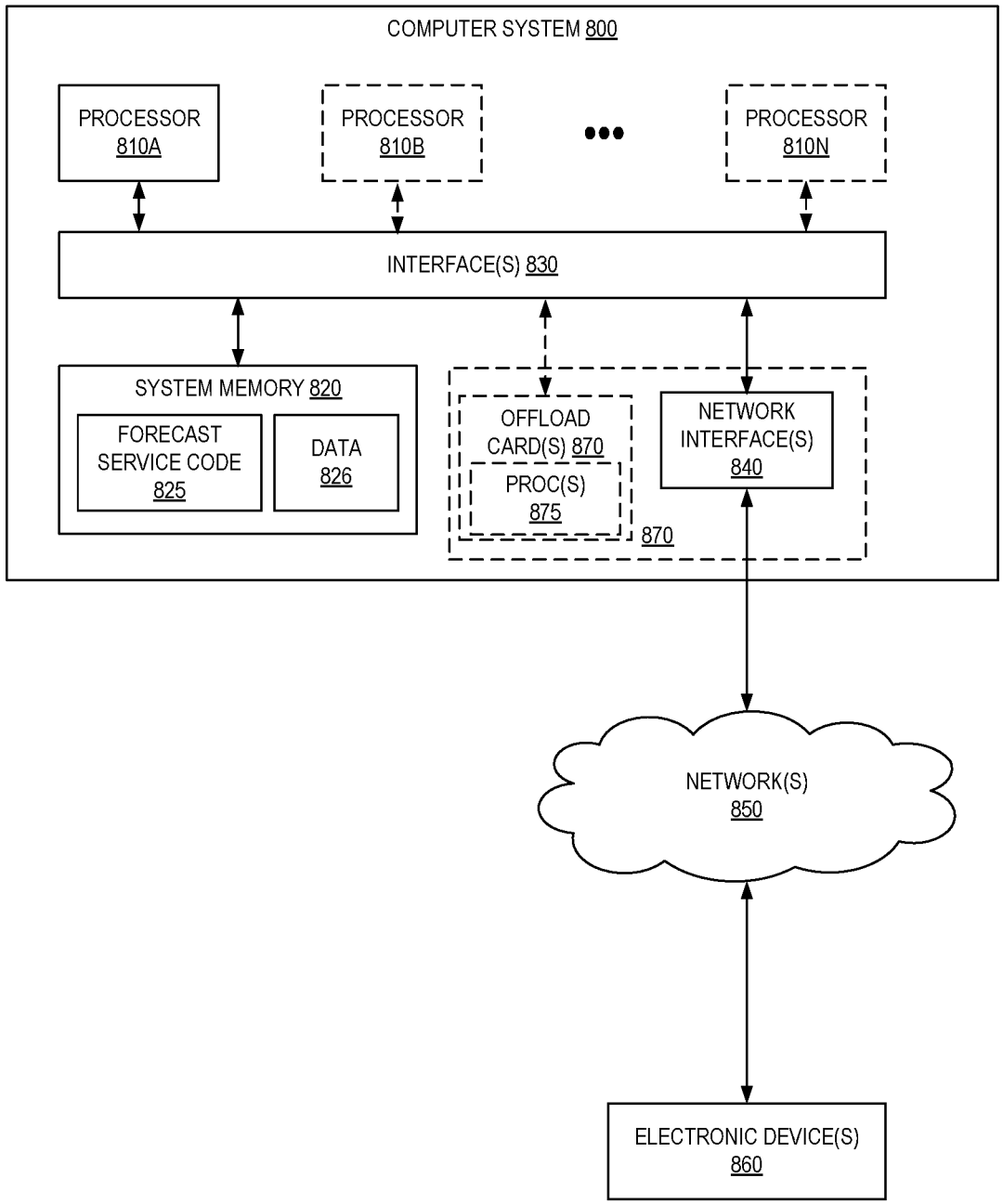
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as forecast service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  receiving, at a machine learning service of a provider network, a request to train a machine learning model on time series data;
  receiving, at the machine learning service of the provider network, an input for the machine learning model that comprises a first feature weight that represents a first pivot time period, a second feature weight that represents a second pivot time period, and a third feature weight that represents a third pivot time period after the second pivot time period;
  performing a first interpolation, by the machine learning service of the provider network, on the first feature weight and the second feature weight for a time period between the first pivot time period and the second pivot time period to generate an interpolated first weight of the first feature weight for a feature vector and an interpolated second weight of the second feature weight for the feature vector;

performing a second interpolation, by the machine learning service of the provider network, on the second feature weight and the third feature weight for a second time period between the second pivot time period and the third pivot time period to generate an interpolated third weight of the second feature weight for the feature vector and an interpolated fourth weight of the third feature weight for the feature vector;

determining, by the machine learning service of the provider network, a first coefficient for the machine learning model based at least in part on the time series data, the interpolated first weight of the first feature weight from the feature vector, the interpolated second weight of the second feature weight from the feature vector, the interpolated third weight of the second feature weight from the feature vector, and the interpolated fourth weight of the third feature weight from the feature vector;

back-testing the machine learning model using forecasted data, generated by the machine learning model, against actual data to update another coefficient of the machine learning model;

generating, by the machine learning model comprising the first coefficient and the another coefficient, a prediction for a future time period; and transmitting the prediction to a client application or to a storage location.

2. The computer-implemented method of claim 1, wherein the second pivot time period is a floating day for a specific event.

3. The computer-implemented method of claim 1, wherein the second pivot time period is multiple, consecutive floating days for a specific event.

4. The computer-implemented method of claim 1, further comprising determining a second coefficient for the machine learning model based at least in part on the time series data and a second feature vector of day of a week features, wherein the generating the prediction for the future time period is by the machine learning model comprising the first coefficient and the second coefficient.

5. The computer-implemented method of claim 4, further comprising determining a third coefficient for the machine learning model based at least in part on the time series data and a third feature vector of yearly features, wherein the generating the prediction for the future time period is by the machine learning model comprising the first coefficient, the second coefficient, and the third coefficient.

6. The computer-implemented method of claim 1, further comprising determining a second coefficient for the machine learning model based at least in part on the time series data and a second feature vector of yearly features, wherein the generating the prediction for the future time period is by the machine learning model comprising the first coefficient and the second coefficient.

7. The computer-implemented method of claim 1, further comprising, weighing a later, first subset of the time series data more than a second subset of the time series data.

8. The computer-implemented method of claim 1, further comprising:

receiving updated time series data; and modifying one or more hyperparameters of the machine learning model comprising the first coefficient based at least in part on the updated time series data.

9. The computer-implemented method of claim 1, wherein the prediction comprises a prediction of an online traffic level for the future time period.

10. A system comprising:

a first one or more electronic devices to implement a storage service in a multi-tenant provider network to store time series data; and a second one or more electronic devices to implement a machine learning service in the multi-tenant provider network, the machine learning service including instructions that upon execution cause the machine learning service to perform operations comprising:

receiving a request to train a machine learning model on time series data, receiving an input for the machine learning model that comprises a first feature weight that represents a first pivot time period, a second feature weight that represents a second pivot time period, and a third feature weight that represents a third pivot time period after the second pivot time period, performing a first interpolation on the first feature weight and the second feature weight for a time period between the first pivot time period and the second pivot time period to generate an interpolated first weight of the first feature weight for a feature vector and an interpolated second weight of the second feature weight for the feature vector, performing a second interpolation on the second feature weight and the third feature weight for a second time period between the second pivot time period and the third pivot time period to generate an interpolated third weight of the second feature weight for the feature vector and an interpolated fourth weight of the third feature weight for the feature vector, determining a first coefficient for the machine learning model based at least in part on the time series data, the interpolated first weight of the first feature weight from the feature vector, the interpolated second weight of the second feature weight from the feature vector, the interpolated third weight of the second feature weight from the feature vector, and the interpolated fourth weight of the third feature weight from the feature vector, back-testing the machine learning model using forecasted data, generated by the machine learning model, against actual data to update another coefficient of the machine learning model, generating, by the machine learning model comprising the first coefficient and the another coefficient, a prediction for a future time period, and transmitting the prediction to a client application or to a storage location.

11. The system of claim 10, wherein the operations further comprise determining a second coefficient for the machine learning model based at least in part on the time series data and a second feature vector of day of a week features, wherein the generating the prediction for the future time period is by the machine learning model comprising the first coefficient and the second coefficient.

12. The system of claim 11, wherein the operations further comprise determining a third coefficient for the machine learning model based at least in part on the time series data and a third feature vector of yearly features, wherein the generating the prediction for the future time period is by the machine learning model comprising the first coefficient, the second coefficient, and the third coefficient.

13. The system of claim 10, wherein the operations further comprise:
  receiving updated time series data; and
  modifying one or more hyperparameters of the machine learning model comprising the first coefficient based at least in part on the updated time series data.

14. The system of claim 10, wherein the second pivot time period is a floating day for a specific event.

15. A computer-implemented method comprising:
  receiving, at a machine learning service of a provider network, a request to train a machine learning model on time series data;
  receiving, at the machine learning service of the provider network, a first input for the machine learning model that comprises a first feature weight that represents a first pivot time period and a second feature weight that represents a second pivot time period, and a second input for the machine learning model that comprises a third feature weight that represents a third pivot time period and a fourth feature weight that represents a fourth pivot time period;
  performing a first interpolation, by the machine learning service of the provider network, on the first feature weight and the second feature weight for a time period between the first pivot time period and the second pivot time period to generate an interpolated first weight of the first feature weight for a first feature vector and an interpolated second weight of the second feature weight for the first feature vector;
  performing a second interpolation, by the machine learning service of the provider network, on the third feature weight and the fourth feature weight for a time period between the third pivot time period and the fourth pivot time period to generate an interpolated third weight of the third feature weight for a second feature vector and an interpolated fourth weight of the fourth feature weight for the second feature vector;
  determining, by the machine learning service of the provider network, a first coefficient for the machine learning model based at least in part on the time series data, the interpolated first weight of the first feature weight from the first feature vector, and the interpolated second weight of the second feature weight from the first feature vector;
  determining a second coefficient for the machine learning model based at least in part on the time series data, the interpolated third weight of the third feature weight from the second feature vector, and the interpolated fourth weight of the fourth feature weight from the second feature vector;
  back-testing the machine learning model using forecasted data, generated by the machine learning model, against actual data to update another coefficient of the machine learning model;
  generating, by the machine learning model comprising the first coefficient and the second coefficient, and the another coefficient, a prediction for a future time period; and
  transmitting the prediction to a client application or to a storage location.

16. The computer-implemented method of claim 15, wherein the second pivot time period is a floating day for a specific event.

17. The computer-implemented method of claim 15, wherein the second pivot time period is multiple, consecutive floating days for a specific event.

18. The computer-implemented method of claim 15, further comprising,
  weighing a later, first subset of the time series data more than a second subset of the time series data.

19. The computer-implemented method of claim 15, further comprising:
  receiving updated time series data; and
  modifying one or more hyperparameters of the machine learning model comprising the first coefficient and the second coefficient based at least in part on the updated time series data.

20. The computer-implemented method of claim 15, wherein the prediction comprises a prediction of an online traffic level for the future time period.

* * * * *